United States Patent
Goldman et al.

(10) Patent No.: US 12,548,723 B1
(45) Date of Patent: Feb. 10, 2026

(54) INTELLIGENT RELAY PACKAGE FOR PLACEMENT IN A LOAD TRAY

(71) Applicant: Lunar Energy, Inc., Mountain View, CA (US)

(72) Inventors: Mark Daniel Goldman, Los Altos Hills, CA (US); Andrew Diao, Santa Cruz, CA (US); Arthur G. Sandoval, Orinda, CA (US); Timothy D. Ganstrom, Sammamish, WA (US); Jonathan M. Schreven, Spokane, WA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/900,193

(22) Filed: Sep. 27, 2024

(51) Int. Cl.
*H01H 47/00* (2006.01)
*H01H 50/04* (2006.01)
*H01H 50/12* (2006.01)

(52) U.S. Cl.
CPC ........ *H01H 47/002* (2013.01); *H01H 50/047* (2013.01); *H01H 50/12* (2013.01)

(58) Field of Classification Search
CPC ..... H01H 47/002; H01H 50/047; H01H 50/12
USPC ...................................................... 361/93.8
See application file for complete search history.

(56) References Cited

U.S. PATENT DOCUMENTS

| | | | | |
|---|---|---|---|---|
| 6,635,837 | B2 * | 10/2003 | Subramanian | H01H 50/005 361/207 |
| 7,362,011 | B2 * | 4/2008 | Komatsu | H01H 1/605 307/137 |
| 2002/0171986 | A1 * | 11/2002 | Figueroa | H02B 1/56 361/93.1 |
| 2005/0275993 | A1 * | 12/2005 | Phillips | H01H 47/002 361/103 |
| 2011/0096495 | A1 * | 4/2011 | Heise | H05K 1/0263 361/688 |
| 2012/0113569 | A1 * | 5/2012 | Peralta | H02B 1/56 174/548 |
| 2016/0325602 | A1 * | 11/2016 | Graf | H05B 1/0236 |
| 2020/0077489 | A1 * | 3/2020 | Lombardi | H01H 9/02 |
| 2021/0027501 | A1 * | 1/2021 | Moss | G06T 7/11 |
| 2021/0120693 | A1 * | 4/2021 | Namuduri | H01L 23/24 |
| 2021/0383985 | A1 * | 12/2021 | Mori | H01H 85/47 |

(Continued)

FOREIGN PATENT DOCUMENTS

| | | | | |
|---|---|---|---|---|
| CA | 3012183 A1 * | 7/2017 | | G08C 17/02 |
| CN | 211426166 U * | 9/2020 | | |

(Continued)

OTHER PUBLICATIONS

Mittelstadt Chad; Doorless modular panelboard; Filing date: Jul. 11, 2016; abstract, specification and drawings (Year: 2023).*

*Primary Examiner* — Dharti H Patel
(74) *Attorney, Agent, or Firm* — Van Pelt, Yi & James LLP

(57) ABSTRACT

An intelligent relay package is disclosed, comprising: a relay configured to control delivery of current to a load, wherein the relay comprises a set of contacts; and a set of rigid busbars coupled to the set of contacts of the relay, wherein the set of rigid busbars is configured to transfer heat generated due to contact resistance away from the set of contacts and to a set of wires coupled to the set of rigid busbars, wherein the intelligent relay package is sized to fit within a single slot of a load tray.

17 Claims, 15 Drawing Sheets

(56) References Cited

U.S. PATENT DOCUMENTS

| | | | | |
|---|---|---|---|---|
| 2023/0162937 A1* | 5/2023 | Telefus | ................... | H02M 1/08 |
| | | | | 361/2 |
| 2023/0361771 A1* | 11/2023 | Prasad | ................... | H01L 25/072 |
| 2024/0027501 A1* | 1/2024 | Alvi | ....................... | G01R 23/02 |

FOREIGN PATENT DOCUMENTS

| | | | | | |
|---|---|---|---|---|---|
| CN | 212723222 | U | * | 3/2021 | |
| CN | 118202434 | A | * | 6/2024 | ............... H01H 9/02 |
| JP | 2000050464 | A | * | 2/2000 | |
| JP | 2024080720 | A | * | 6/2024 | |
| WO | WO-2021153206 | A1 | * | 8/2021 | ......... B60R 16/0238 |
| WO | WO-2021218285 | A1 | * | 11/2021 | .............. G01M 3/20 |
| WO | WO-2023162880 | A1 | * | 8/2023 | ................ B60L 3/04 |

* cited by examiner

US 12,548,723 B1

INTELLIGENT RELAY PACKAGE FOR PLACEMENT IN A LOAD TRAY

BACKGROUND OF THE INVENTION

Relays are electrically operated switches. For example, a relay can be used to switch on and off current to a load (e.g., a home appliance). A relay allows current to pass through when its set of contacts are closed and the relay prevents current from passing through when its set of contacts are opened. However, when the contacts of the relay are closed and therefore touching, the flow of current crosses the contacts and resistance at the interface of the contacts creates heat. Heat that is generated by the closed relay could impair the function of the relay itself and/or nearby electrical/mechanical components, especially when the relay is encased. As such, it would be desirable to draw heat away from an enclosed relay, especially when the relay is in close proximity to other components.

BRIEF DESCRIPTION OF THE DRAWINGS

Various embodiments of the invention are disclosed in the following detailed description and the accompanying drawings.

DETAILED DESCRIPTION

Figure 1:
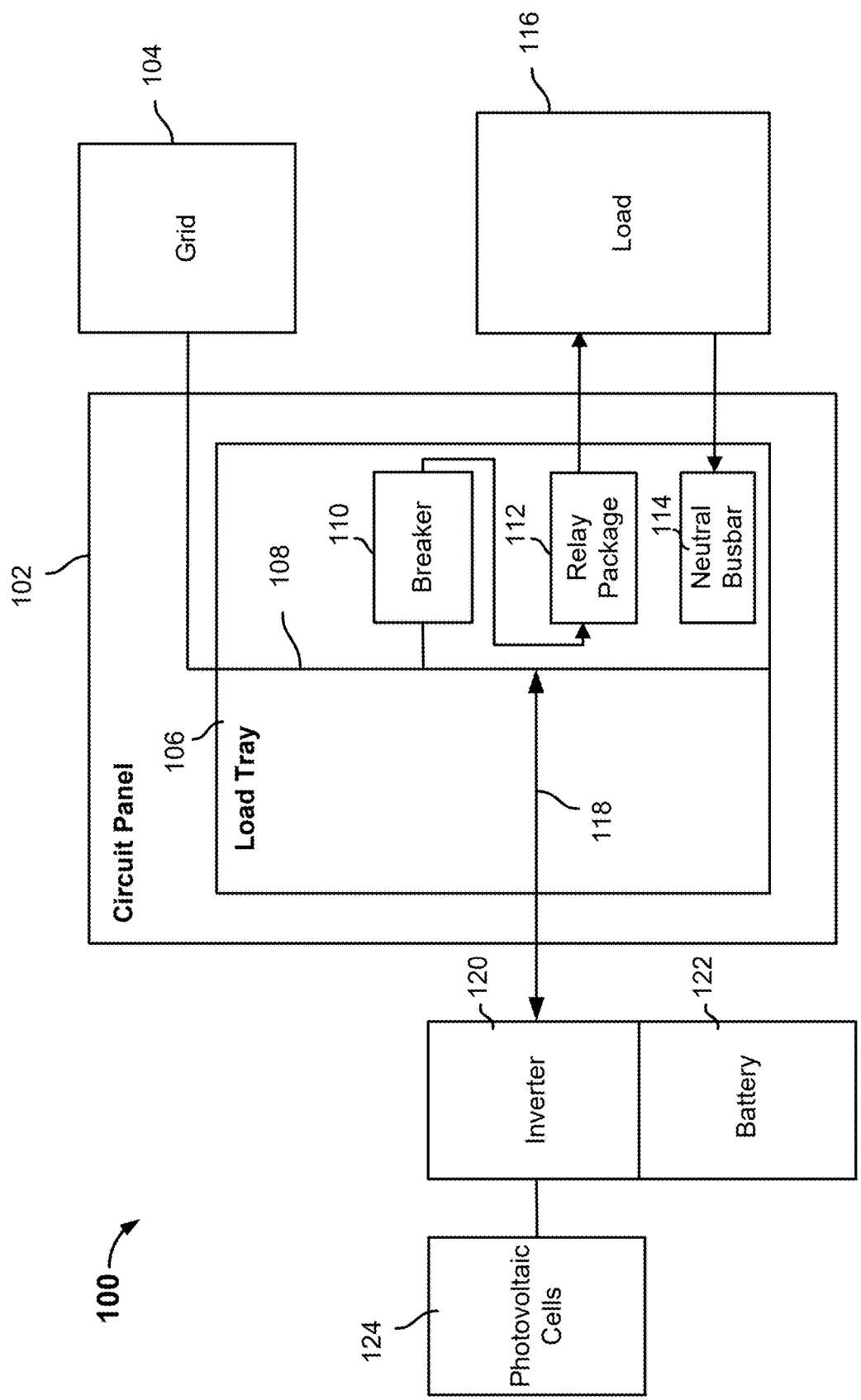
FIG. 1 is a diagram showing a system for managing electric power sources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of an intelligent relay package for placement in a load tray are described herein. The relay package includes at least one relay to control delivery of current to a load. Each relay comprises a set of contacts that are caused to be closed (e.g., by a controlled mechanism in the relay) when current is allowed to pass through to the load and then the set of contacts are caused to be open (e.g., by the controlled mechanism) when current is not allowed to pass through to the load. The relay package further comprises a set of rigid busbars coupled to the set of contacts of the relay. When current is allowed to pass through the relay's contacts in a closed state, the imperfect and non-continuous interface between the set of contacts creates a resistance. The heat that is generated by the relay's set of contacts is a function of at least the current and also the resistance between the contacts. The set of rigid busbars that are electrically connected to the set of contacts are configured to conduct heat that is generated by the set of contacts away from the contacts. The set of rigid busbars are coupled to a set of wires, which comprise heat sinks for the heat drawn away from the relay's set of contacts. In some embodiments, the relay package comprises an enclosure around the relay and the set of rigid busbars. The relay package is sized to fit within a single slot of a load tray. For example, the single slot of a load tray typically accommodates the area of one side/surface of a single-pole (circuit) breaker.

FIG. 1 is a diagram showing a system for managing electric power sources. As shown in FIG. 1, system 100 includes circuit panel 102, which includes load tray 106. Load tray 106 includes busbar 108 that is in turn connected to breaker 110. Circuit panel 102 is connected to two alternative power sources: grid 104 and inverter 120. Grid 104 comprises a power grid provided by, for example, a utility company. In one example use case, grid 104 is the primary source of power and delivers current via wiring to load tray 106. Circuit panel 102 monitors grid 104 for potential issues in the current delivery, such as in the case of a brown out or a black out. When no such issues are detected by circuit panel 102, the current from grid 104 flows into busbar 108 of load tray 106. The current from grid 104 can then flow through busbar 108 into regular breakers, including breaker 110, through relay package 112 to ultimately power load(s) such as load 116. Each load, such as load 116, is also connected to neutral busbar 114 in load tray 106 to complete the circuit back to the source of power. Examples of load 116 include household appliances and other electrical devices that draw power. When the power that passes through any breaker such as breaker 110 exceeds or meets a fault condition (e.g., the current exceeds a threshold amount), the triggered breaker will shut off the flow of current to load(s) 116. For example, load 116 may draw electricity from a 120V outlet or a 240V outlet, depending on the amount of current that it needs. Depending on the voltage needs (e.g., either 120V or 240V) of load 116, load 116 is protected by and therefore connected upstream (in series) to either a single-pole or a double-pole type of breaker (e.g., breaker 110) in load tray 106.

When circuit panel 102 detects an issue with the power supplied by grid 104, circuit panel 102 will instead allow current to flow from, for example, a secondary power source via wiring 118 into load tray 106. One reason to disconnect load tray 106 from grid 104 in the event of an issue is that maintenance personnel may be working on grid 104 and the flow of current from load tray 106 to grid 104 could cause injury to the workers. In the example of system 100, the secondary power source that is coupled to load tray 106 comprises battery 122 that stores energy produced by photovoltaic cells 124 (e.g., photovoltaic cells 124 are part of solar panels that are installed in an outside location that receives sunlight). Specifically, photovoltaic cells 124 generate energy in the form of direct current (DC) which may then be stored onto battery 122 for later use. When current is needed to be drawn into load tray 106 from the secondary power source (e.g., in response to an issue detected by circuit panel 102 from the primary power source such as grid 104), either the DC that is produced by photovoltaic cells 124 or the DC that is stored onto battery 122 is first converted into alternating current (AC) and then that current flows into busbar 108 to ultimately pass through breaker(s) such as breaker 110 via relay package 112 to power load(s) 116.

Relay package 112, which is connected, in series, upstream to breaker 110 and downstream to load 116, comprises a set of relays which operate as switch(es) to current that is supplied to load 116. In some embodiments, relay package 112 comprises up to two independently controlled relays, each of which operates as a switch for the current of a respective single-pole (each single-pole provides 120V of electricity). For example, one relay of relay package 112 can be connected upstream to a single-pole breaker (which protects against an excess of current to a 120V load) or both relays of relay package 112 can be connected to an upstream double-pole breaker (which protects against an excess of current to a 240V load), depending on the current needs (120V or 240V) of downstream load 116. Put another way, relay package 112 includes relay(s) that can control the flow of current to either a 120V load or a 240V load. In addition to the up to two relays, relay package 112 further includes a circuit board that includes electrical components (e.g., power supply, relay drivers, communication interface, sensors, etc.) that are configured to receive instructions (e.g., from a hub device that can also be placed within load tray 106) for operating the relay(s) as switches on the current to supply to load 116. For example, relay package 112 may receive and execute an instruction to switch on (e.g., allow current to pass through) or switch off (e.g., prevent current from passing through) to load 116. In another example, relay package 112 can send out (e.g., to the hub device) measured/sensed voltage and/or current measurements.

Relay package 112, which logically sits between breaker 110 and load 116, has a form factor that is compact enough to be slotted directly within load tray 106 and is therefore co-located with breaker 110 to which it is coupled via wire. As such, electrical installers that are familiar with installing load tray 106 at a site could be easily familiarized with installing relay packages such as relay package 112 along with their connected breakers such as breaker 110 within load tray 106. As will be described in further detail below, in various embodiments, the enclosure of relay package 112 has an area footprint within load tray 106 that is similar to that of a single-pole breaker and also includes engagement mechanisms that would allow relay package 112 to be secured or engaged within a single-pole breaker-sized slot within load tray 106. Also, as will be described in further detail below, relay package 112's compact form factor is achieved through stacking of the up to two relays within the enclosure. Furthermore, the management of heat that is generated by the imperfect contact between contact terminals of each relay within relay package 112 is achieved, at least in part, via a set of rigid busbars that effectively draw heat away from each relay's contact terminals and out of the enclosure of relay package 112 and leverages the wiring to one of both of upstream breaker 110 and load 116 as heat sinks.

Figure 2:
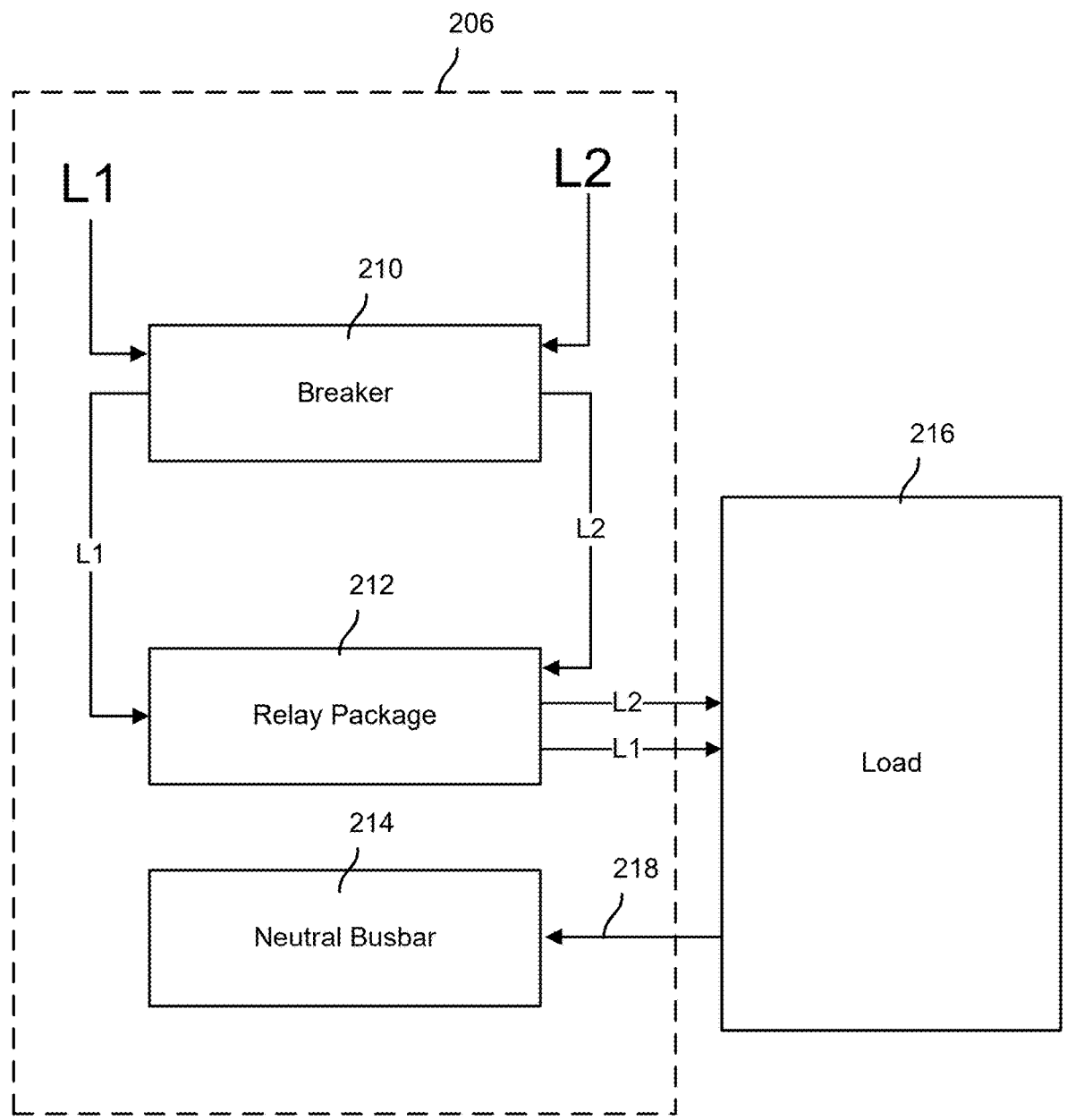
FIG. 2 is a diagram showing a zoomed-in example of connections among elements in a load tray and a load in accordance with some embodiments.

FIG. 2 is a diagram showing a zoomed-in example of connections among elements in a load tray and a load in accordance with some embodiments. Breaker 210 may be used to implement breaker 110 of FIG. 1, relay package 212 may be used to implement relay package 112, busbars L1 and L2 may be used to implement busbar 108 of FIG. 1, neutral busbar 214 may be used to implement neutral busbar 114 of FIG. 1, load tray 206 may be used to implement a portion of load tray 106 of FIG. 1, and load 216 may be used to implement load 116. Breaker 210, relay package 212, and neutral busbar 214 are located within load tray 206. In various embodiments, both breaker 210 and relay package 212 are secured into breaker slots within load tray 206. For example, each of breaker 210 and relay package 212 is secured into load tray 206 by being engaged with both a stab in the center of load tray 206 and one or more engagement features (e.g., hooks) on a side of load tray 206, as will be described in further detail below. Neutral busbar 214 may be located on one or more sides of load tray 206, for example.

In the example of FIG. 2, breaker 210 is a double-pole breaker that is connected to busbars L1 and L2 of load tray 206. Because each of busbar L1 and L2 supplies current at 120V and double-pole breaker 210 is connected to both L1 and L2, double-pole breaker 210 is configured to monitor and protect against excessive current delivered via two wires (one wire delivering current from L1 and the other wire delivering current from L2) to load 216 at 240V via relay package 212. Examples of loads that require 240V include ovens, clothes dryers, water heaters, and electric car chargers. A first set of wires delivers the current from load tray busbar L1 to a first relay within relay package 212 and from the first relay within relay package 212 to load 216 to supply 120V to load 216. Furthermore, a second set of wires delivers the current from load tray busbar L2 to a second relay within relay package 212 and from the second relay within relay package 212 to load 216 to supply 120V to load 216. As such, the two sets of wires from load tray busbars L1 and L2 supply a combined 240V to load 216. Also, in the example of FIG. 2, given that the relays within relay package 212 are both connected to double-pole breaker 210, relay package 212 would be configured to actuate both relays to simultaneously open or close both L1 and L2 at the same time because the relays are collectively controlling one 240V load. Wire 218 connects load 216 to neutral busbar 214 of load tray 206 to provide a return path for the current that has been used by load 216.

While not shown in FIG. 2 and will be described in further detail below, each relay of relay package 212 includes a set (e.g., pair) of rigid busbars. Each of a relay's busbars is connected to a contact terminal of the relay and one of the wires to either load tray busbar L1 or L2 and the other of the relay's busbars is connected to load 216. Specifically, in the example where breaker 210 is a double-pole breaker, one busbar of the first relay of relay package 212 is connected to load tray busbar L1 and the other busbar of the first relay of relay package 212 is connected to load 216. Furthermore, one busbar of the second relay of relay package 212 is connected to load tray busbar L2 and the other busbar of the second relay of relay package 212 is connected to load 216. In various embodiments, the heat that is generated when the contact terminals of each relay within relay package 212 are closed is drawn away from the contact terminals via the relay's pair of busbars and ultimately to the wire (which act as heat sinks by virtue of tolerating heat up to the prescribed temperature ratings) that connects a relay busbar upstream to an L1 or L2 pole of breaker 210 and the wire that connects the other relay busbar downstream to load 216.

While not shown in FIG. 2, in other examples, each relay within relay package 212 may be connected to a separate/ independent single-pole breaker and also one breaker/relay must be connected to L1 and the other breaker/relay must be connected to L2. Each single-pole breaker would be configured to monitor and protect against excessive current from either load tray busbars L1 or L2 to be delivered via wiring to a load that requires 120V. Examples of loads that require 120V include dishwashers, microwaves, and computers. Where relay package 212 is connected to two independent single-pole breakers, a first set of wires would connect a first single-pole breaker to one relay within relay package 212 and a second set of wires would connect a second single-pole breaker to the other relay within relay package 212.

Figure 3:
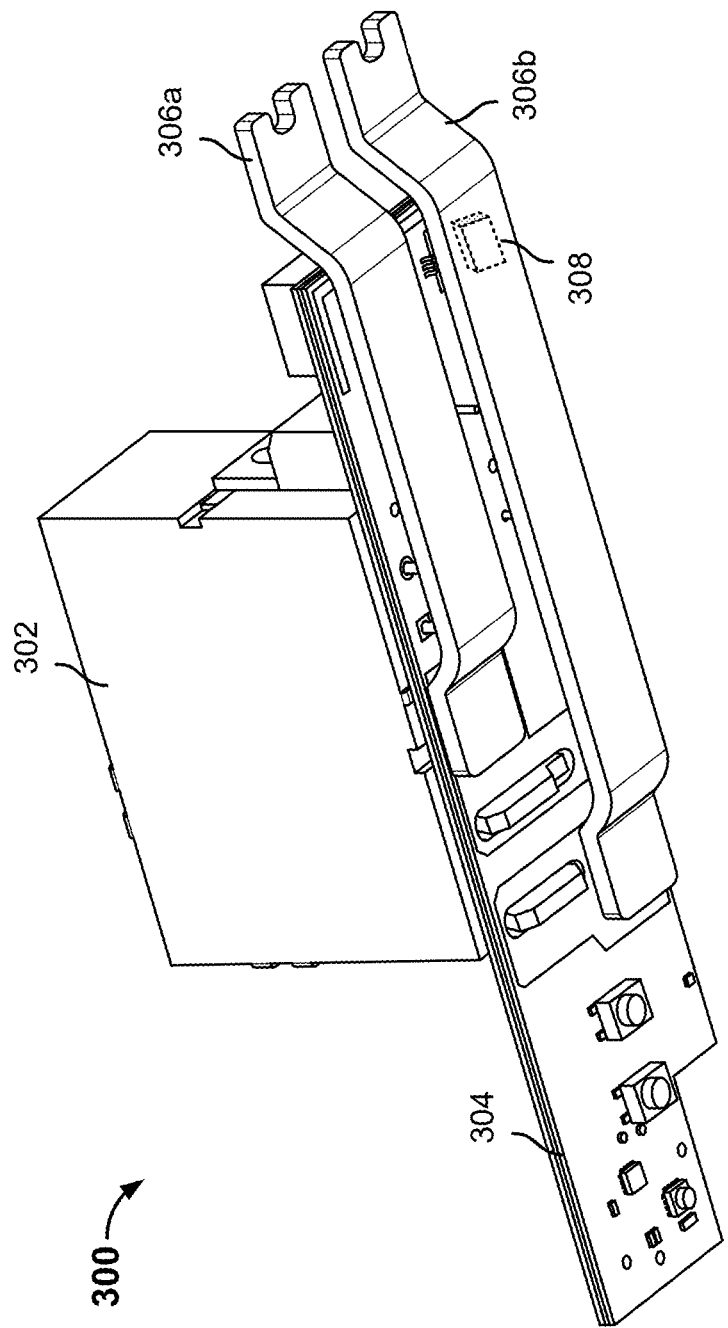
FIG. 3 is a diagram showing an example of a single relay assembly within a relay package in accordance with some embodiments.

FIG. 3 is a diagram showing an example of a single relay assembly within a relay package in accordance with some embodiments. In the example of FIG. 3, relay assembly 300 includes relay 302, carrier board 304, and a pair of busbars, busbar 306a and busbar 306b. In some embodiments, relay 302 comprises a latching single pole single throw (SPST) relay. One advantage of a latching SPST relay is that it takes minimal power to operate as its switching function is triggered by one pulse (as opposed to a continuous source of power) and therefore, the power supply needed to operate the SPST latching relay can be compact in size. Relay 302 includes two contact terminals (not visible in FIG. 3) (comprising one static contact terminal and one mobile contact terminal that can be triggered to contact or move away from the static contact terminal) that can be switched to open (to prevent the flow of current through the relay) or close/ contact (to permit the flow of current through the relay). The contact terminals (not visible in FIG. 3) of relay 302 generate heat when they are in contact due to the imperfect and non-continuous nature of the contact/interface, which creates resistance to the current that is passing through. The heat that is generated by the touching contact terminals of relay 302 can be modeled by the contact resistance between the touching contact terminals and the amount of current flowing across the contact terminals. As part of a relay package, relay assembly 300 is encased within an enclosure and so it would be desirable to draw heat away from relay 302 and out of the enclosure to prevent the internal environment of the enclosure from reaching an undesirable temperature and/or impairing other components of the relay package. As such, the contact terminals of relay 302 are respectively coupled to (e.g., via soldering to carrier board 304) one end of each of busbar 306a and busbar 306b. In some embodiments, each of busbar 306a and busbar 306b is made of copper or another type of electrically and thermally conductive metal. In various embodiments, each of busbar 306a and busbar 306b is wholly rigid. The thermally conductive characteristic of busbar 306a and busbar 306b will therefore draw heat away from relay 302's contact terminals and channel at least some of the heat towards wiring that is connected to the other ends of busbar 306a and busbar 306b. The ends of busbar 306a and busbar 306b that are not coupled to the contact terminals of relay 302 are connected to wires (not shown in FIG. 3) that lead respectively to an upstream breaker and to a downstream load. The wires connected to the ends of busbar 306a and busbar 306b and that lead respectively to an upstream breaker and to a downstream load act as heat sinks to the heat channeled by busbar 306a and busbar 306b. In a specific example, busbar 306a is connected (e.g., via a first metal terminal block and screw) to a first wire carrying current from an upstream breaker that originated from load tray busbar L1 (not shown in FIG. 3) and busbar 306b is connected (e.g., via a second metal terminal block and screw) to a second wire carrying the L1 current to a load.

In some embodiments, current sensor 308 is located on carrier board 304 below one of busbar 306a and busbar 306b and is configured to measure the approximate current through relay 302. In some embodiments, current sensor 308 comprises a Hall effect current sensor (which is oriented parallel to the travel of current), which measures the strength of the magnetic field through the busbar above (e.g., busbar 306b as shown in FIG. 3) as a proxy measurement of the current that is flowing across relay 302's contact terminals. A conventional way of measuring current is to wrap a doughnut-shaped sensor around the current transformer, which is much less space efficient than placing a Hall effect current sensor proximate to (e.g., below) a busbar that is connected to a contact terminal of a relay.

In some embodiments, the dimensions of (e.g., copper-based) busbar 306a and busbar 306b are constrained by one or more of the following factors: the temperature rating of the L1 and L2 wiring from an upstream breaker and to a downstream load, the cost of copper to use to manufacture busbar 306a and busbar 306b, touch safe temperature limits prescribed by standards bodies (e.g., UL Industries), and the need to withstand torquing that will be required to couple the ends of busbar 306a and busbar 306b to L1 and L2 wiring. With respect to the factor of the temperature rating of the L1 and L2 wiring, given that such wiring will be leveraged as heat sinks to the heat emanating from the contacts of relay 302, the design of the size/dimensions of busbar 306a and busbar 306b need to take into account the temperature rating of the L1 and L2 wiring so that heat is not transferred into the L1 and L2 wiring beyond for what the wires are rated.

In the example as shown in FIG. 3, the length of busbar 306a is 56 mm and the length of busbar 306b is 74 mm.

In various embodiments, a relay package (e.g., relay package 112 of FIG. 1) includes two instances of relay assemblies (e.g., relay assembly 300) that are stacked together and soldered to a main board within an enclosure.

Figure 4:
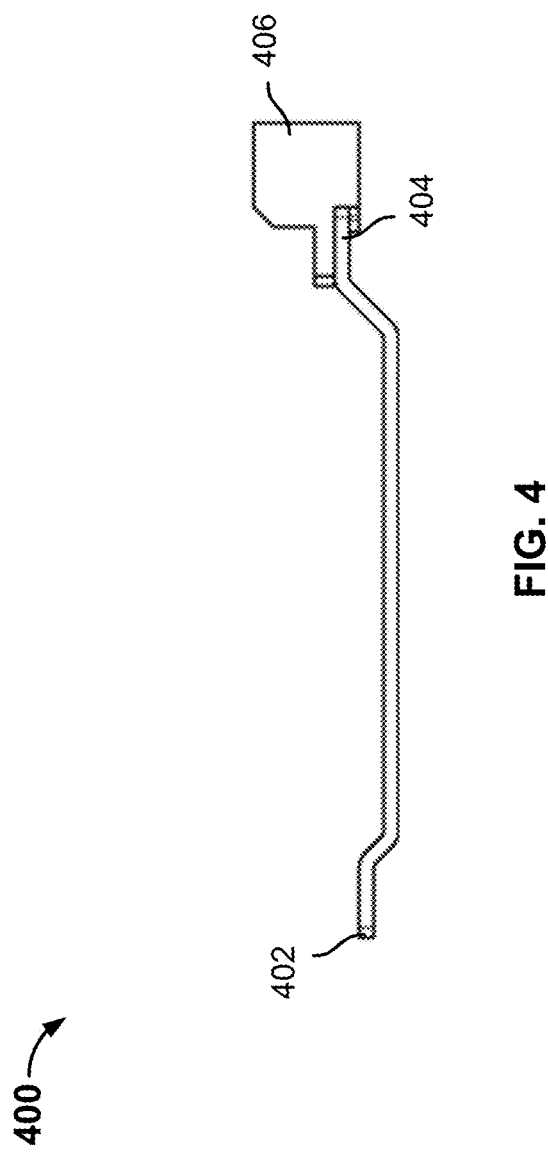
FIG. 4 is a diagram showing a side view of a busbar that is to be coupled to one contact terminal of a relay within a relay package in accordance with some embodiments.

FIG. 4 is a diagram showing a side view of a busbar that is to be coupled to one contact terminal of a relay within a relay package in accordance with some embodiments. For example, either busbar 306a or busbar 306b of relay 302 of FIG. 3 can be implemented by example busbar 400 of FIG. 4. End 402 of busbar 400 would be coupled to one contact terminal of a relay within a relay package. End 404 of busbar 400 would be coupled to a wire that leads out of the enclosure (not shown) of the relay package and the wire could be coupled upstream to a breaker or downstream to a load. In the example of FIG. 4, end 404 of busbar 400 includes terminal block 406, which is also manufactured using an electrically and thermally conductive material (e.g., copper). Terminal block 406 can couple to a wire that leads out of the relay package enclosure via a screw that secures the connection between terminal block 406 and the wire.

Figure 5:
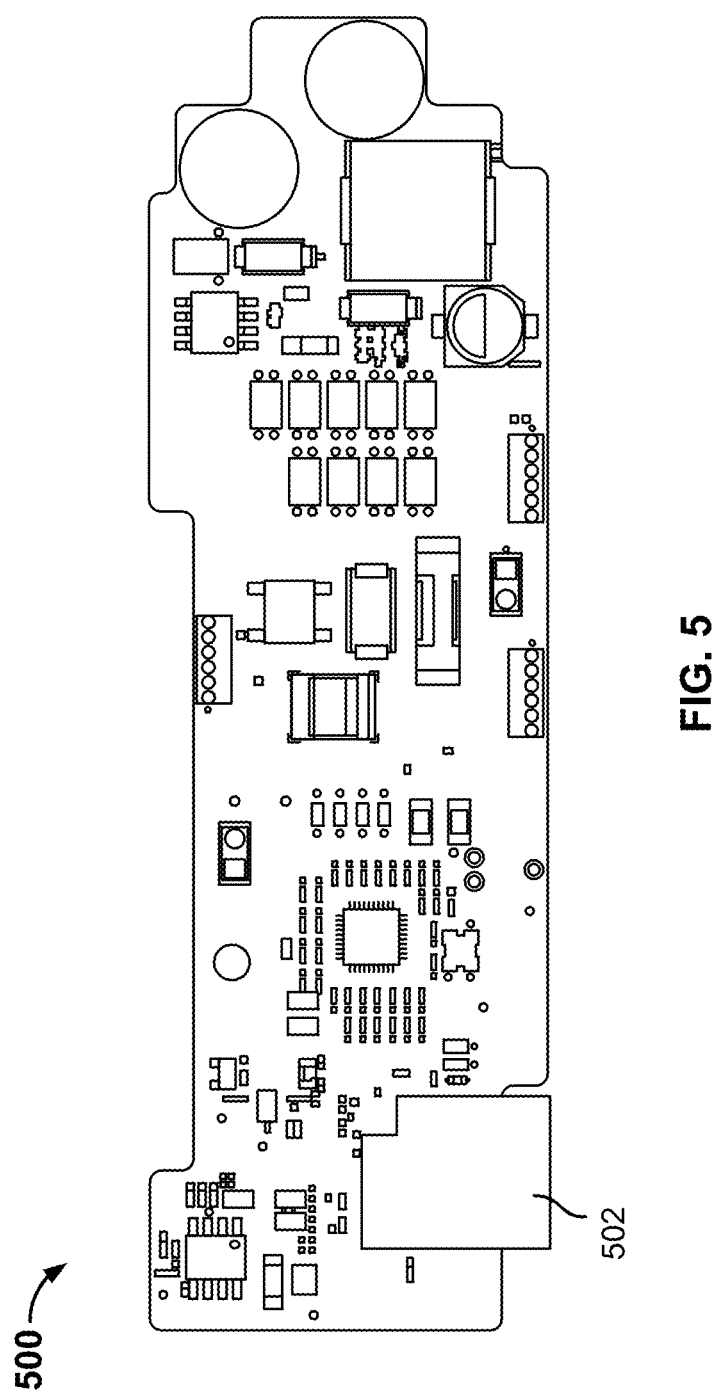
FIG. 5 is a diagram showing an example of a main board that is included in a relay package in accordance with some embodiments.

FIG. 5 is a diagram showing an example of a main board that is included in a relay package in accordance with some embodiments. In various embodiments, main board 500 is configured to receive instructions and send messages to a hub device (e.g., that is co-located with the relay package in the load tray) (e.g., over a mesh WiFi network) and also to drive the relay(s) (e.g., a relay such as relay 302 of FIG. 3) within the same relay package. For example, main board 500 includes hub communication component 502 that is configured to receive instructions from a hub device. Example instructions from the hub device may provide the main board with firmware updates, an instruction to switch a connected load on or off (e.g., by permitting the flow or preventing the flow of current to that load), and/or a query for current and/or voltage telemetry. Main board 500 also includes a power supply, an integrated metering chip (e.g., that collects current readings from the Hall effect current sensors located on the carrier boards coupled to each relay within the relay package), relay driver(s) that drive the relays (e.g., based on instructions from the hub device), a buck converter (for stepping down voltage), and capacitors. In some embodiments, the capacitors of main board 500 are solid capacitors, which include polymer capacitors, ceramic capacitors, and ceramic film capacitors. Solid capacitors are used instead of electrolytic capacitors because electrolytic capacitors include liquid electrolyte, which is more prone to thermal cycling and therefore less reliable and does not accommodate the thermal constraints on the internal environment of the relay package as well as solid capacitors.

In various embodiments, a relay package (e.g., relay package 112 of FIG. 1) includes a main board (e.g., main board 500) that is soldered to up to two instances of relay assemblies (e.g., relay assembly 300) within an enclosure.

Figure 6:
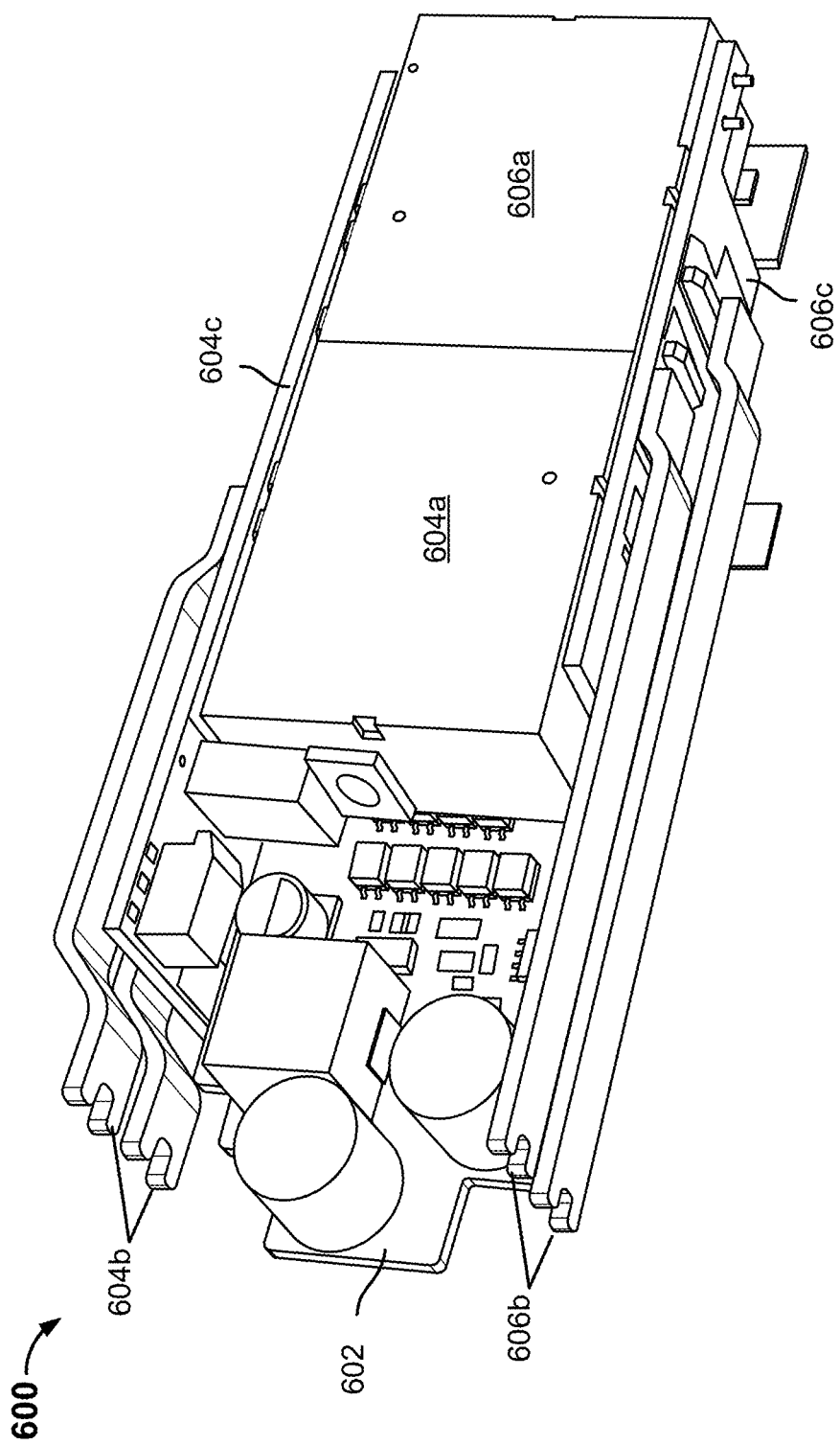
FIG. 6 is a diagram showing an example of a relay package in accordance with some embodiments.

FIG. 6 is a diagram showing an example of a relay package in accordance with some embodiments. In the example of FIG. 6, relay package 600 is shown without an enclosure. Relay package 600 includes a combination of a first relay assembly (including relay 604a, carrier board 604b, and pair of busbars 604c), a second relay assembly (including relay 606a, carrier board 606b, and pair of busbars 606c), and main board 602. In some embodiments, the first relay assembly (including relay 604a, carrier board 604b, and pair of busbars 604c) can be implemented using an instance of relay assembly 300 of FIG. 3 and the second relay assembly (including relay 606a, carrier board 606b, and pair of busbars 606c) can be implemented using another instance of relay assembly 300 of FIG. 3. In some embodiments, main board 602 can be implemented using main board 500 of FIG. 5. Relay package 600 possesses a compact form factor due to the first and second relay assemblies being stacked together. Specifically, in the example shown in FIG. 6, relay package 600 includes relay 604a and relay 606a being stacked together side-by-side, the stacked side-by-side relays 604a and 606a are placed over main board 602, and main board 602 is soldered to both carrier boards 604b and 606b. As shown in FIG. 6, relays 604a and 606a are packed closely to each other. The plastic bodies of relays 604a and 606a face each other, and their high voltage contacts face outside. This arrangement causes the high voltage contacts to point outwards. As such, for relay 604a, the contacts point outwards in a way that is closer to the wire entrance and so its busbars 604b are shown to be shorter than busbars 606b. For relay 606a, the contacts point outwards in a way that is further to the wire entrance and so its busbars 606b are shown to be longer than busbars 604b.

Figure 7:
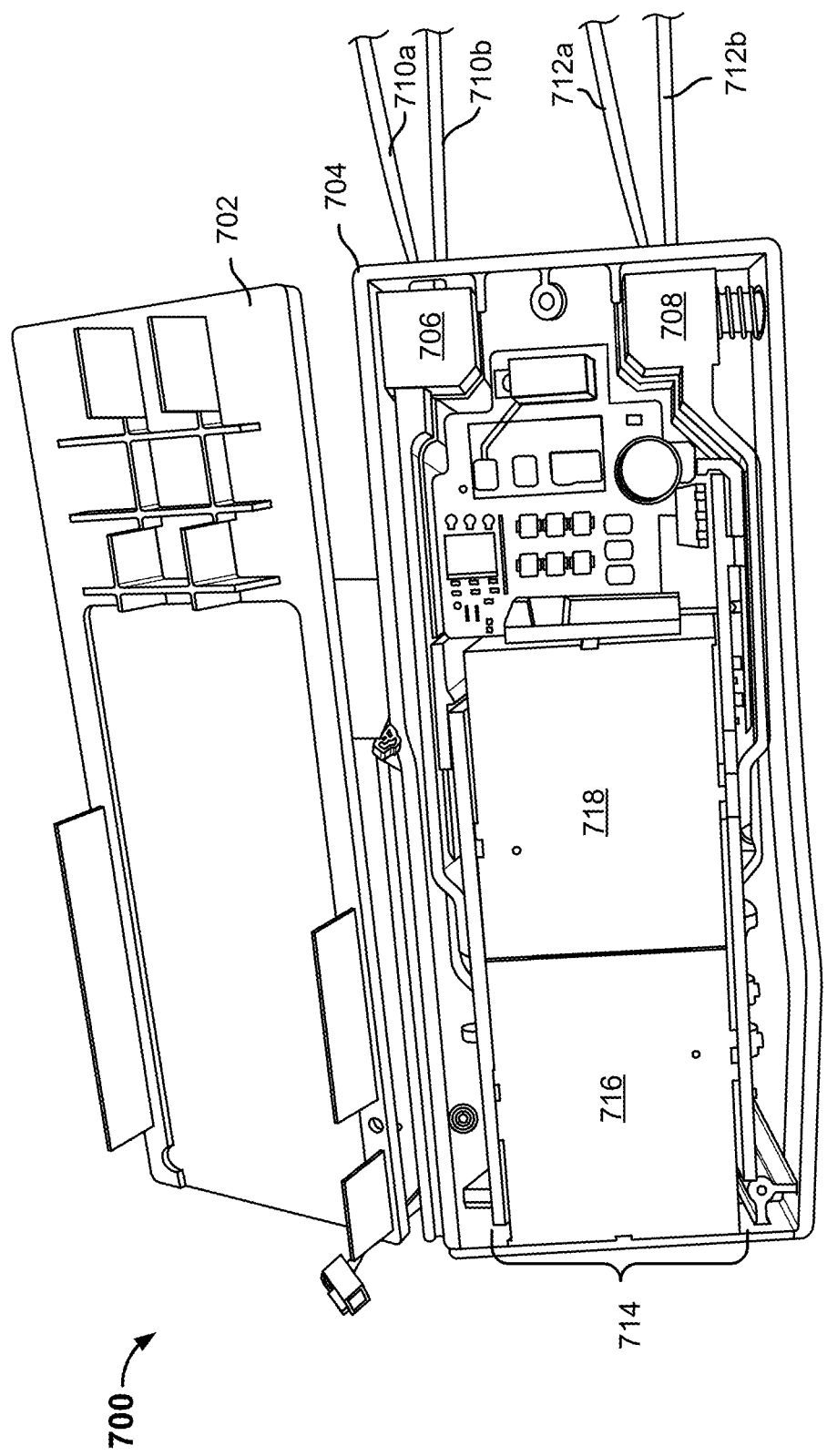
FIG. 7 is a diagram showing an example of a relay package with an external closure in accordance with some embodiments.

FIG. 7 is a diagram showing an example of a relay package with an external closure in accordance with some embodiments. In the example of FIG. 7, relay package 700 is shown with an enclosure that is open. The enclosure comprises open container 704 in which relay package 714 is fitted. In various embodiments, a relay package's enclosure is manufactured using an electrically insulating material. For example, relay package 714 may be implemented using relay package 600 of FIG. 6. The enclosure further comprises lid 702, which can be folded over to engage with container 704, such that relay package 714 is surrounded on all sides by the combination of container 704 and lid 702. While not visible in FIG. 7, at least one side of container 704 of the enclosure includes a set of apertures (e.g., holes) through which wires (e.g. 710a, 710b, 712a, and 712b) that are electrically coupled to terminal blocks (including terminal blocks 706 and 708) can pass. As mentioned above and shown in FIG. 4, in some embodiments, each relay in a relay package has contact terminals that are electrically coupled to a pair of (e.g., copper) busbars, and each busbar may be coupled to a respective (e.g., copper) terminal block, which in turn may be coupled to a wire that leads to either an upstream breaker or a downstream load. Returning to FIG. 7, the pair of terminal blocks including terminal block 706 and another one that is occluded in FIG. 7 by terminal block 706 (the pair of terminals blocks are electrically coupled to the busbars coupled to the contacts of relay 716) are coupled to respective wires 710a and 710b. Furthermore, the pair of terminal blocks including terminal block 708 and another one that is occluded in FIG. 7 by terminal block 708 (the pair of terminals blocks are electrically coupled to the busbars coupled to the contacts of relay 718) are coupled to respective wires 712a and 712b. For example, wire 710a is connected to a terminal of an upstream double-pole breaker that received current from the load tray's L1 busbar and wire 710b is connected to a terminal of a downstream load. Similarly, wire 712a is connected to a terminal of an upstream double-pole breaker that received current from the load tray's L2 busbar and wire 712b is connected to a terminal of a downstream load.

As mentioned above, in various embodiments, the heat that is produced by relay 716's contacts is transferred by relay 716's pair of busbars towards the attached terminal blocks (including terminal block 706) and towards wires 710a and 710b, that act as a heat sink to relay 716's heat. Similarly, in various embodiments, the heat that is produced by relay 718's contacts is transferred by relay 718's pair of busbars towards the attached terminals blocks (including terminal block 708) and towards wires 712a and 712b, that act as a heat sink to relay 718's heat.

Figure 8:
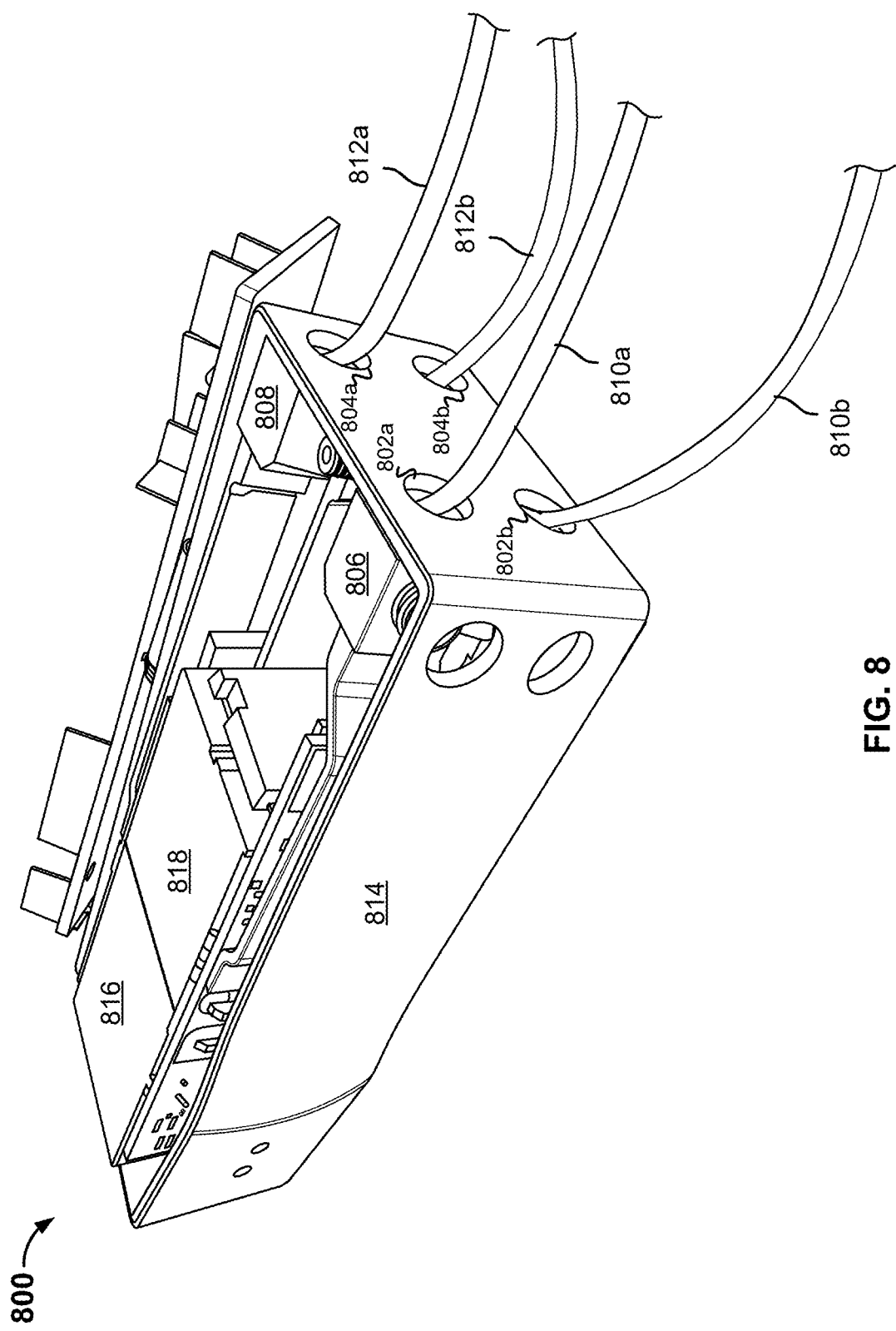
FIG. 8 is a diagram showing another example of a relay package with an external enclosure in accordance with some embodiments.

FIG. 8 is a diagram showing another example of a relay package with an external enclosure in accordance with some embodiments. In the example of FIG. 8, relay package 800 is shown with an enclosure that is open. In the example of FIG. 8, one side of enclosure 814 includes apertures (e.g., through-holes) 802a, 802b, 804a, and 804b. Apertures 802a and 802b respectively allow wires 810a and 810b to pass from the interior to the exterior of enclosure 814. Wire 810a is coupled to terminal block 806, which is coupled to a first busbar that is in turn connected to a first contact of relay 818. Wire 810b is coupled to another terminal block that is occluded in FIG. 8, which is coupled to a second busbar that is in turn connected to a second contact of relay 818. For example, wire 810a is connected to a terminal of an upstream breaker that is connected to the load tray's busbar L1 and wire 810b is connected to a terminal of a downstream load. The heat that is generated by the contacts of relay 818 will then be drawn away from those contacts by the relay's pair of busbars and then drawn out of enclosure 814 via wires 810a and 810b. Apertures 804a and 804b respectively allow wires 812a and 812b to pass from the interior to the exterior of enclosure 814. Wire 812a is coupled to terminal block 808, which is coupled to a first busbar that is in turn connected to a first contact of relay 816. Wire 812b is coupled to another terminal block that is occluded in FIG. 8, which is coupled to a second busbar that is in turn connected to a second contact of relay 816. For example, wire 812a is connected to a terminal of an upstream breaker that is connected to the load tray's busbar L2 and wire 812b is connected to a terminal of a downstream load. The heat that is generated by the contacts of relay 816 will then be drawn away from those contacts by the relay's pair of busbars and then drawn out of enclosure 814 via wires 812a and 812b.

Figure 9:
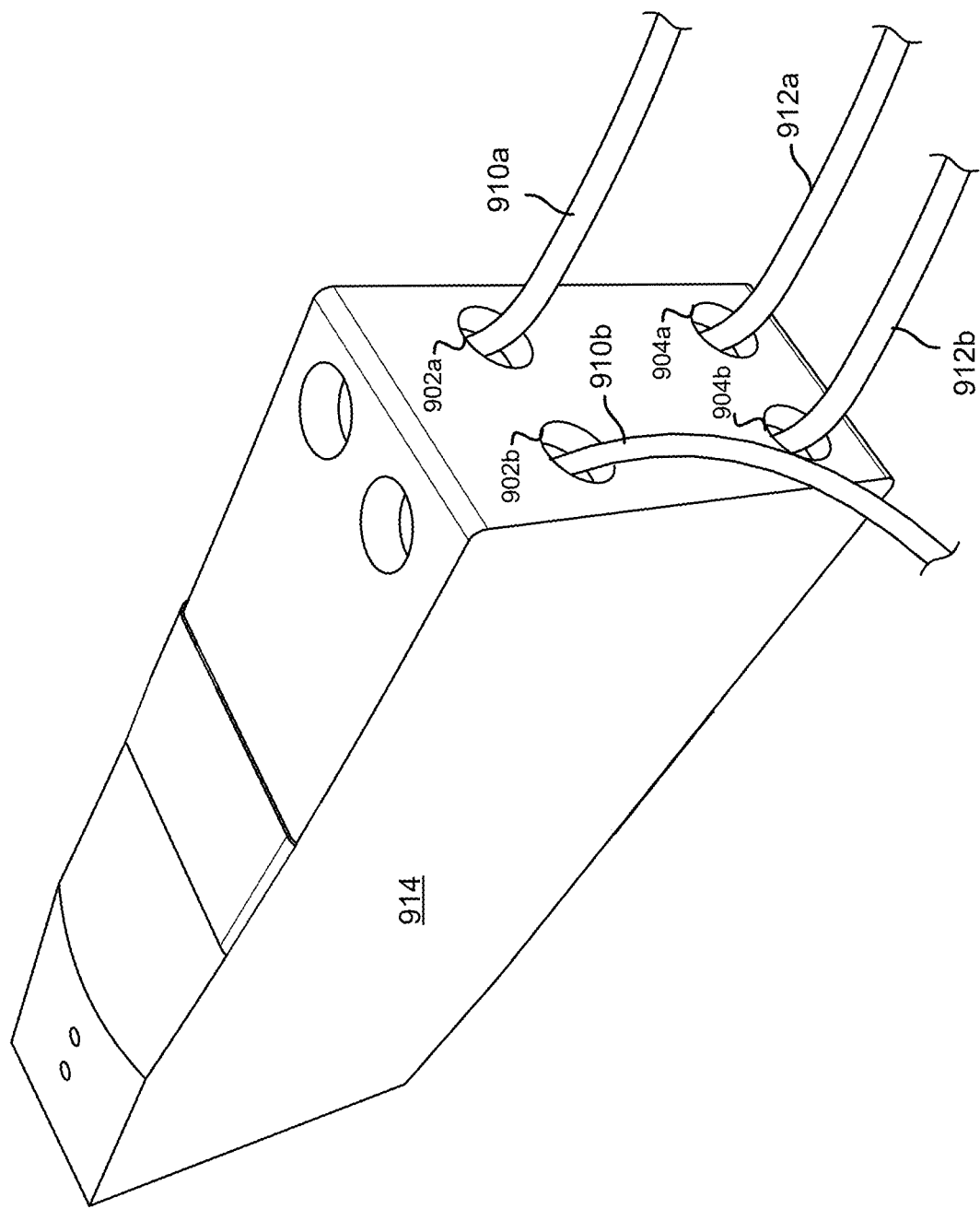
FIG. 9 is a diagram showing yet another example of a relay package with an external closure in accordance with some embodiments.

FIG. 9 is a diagram showing yet another example of a relay package with an external closure in accordance with some embodiments. In the example of FIG. 9, a relay package is shown with enclosure 914 that is closed. In the example of FIG. 9, one side of enclosure 914 includes apertures (e.g., through-holes) 902a, 902b, 904a, and 904b, which are similar to the apertures 802a, 802b, 804a, and 804b of FIG. 8. Similar to what is shown in FIG. 8, apertures 902a and 902b respectively allow wires 910a and 910b to pass from the interior to the exterior of enclosure 914. The first ends of wires 910a and 910b are respectively connected to (via a breaker) the (terminal blocks of) busbars of a first relay within the relay package enclosed by enclosure 914 and the second ends of wires 910a and 910b are respectively connected to the load tray's busbar L1 and a terminal of a downstream load. The first ends of wires 912a and 912b are respectively connected to the (terminal blocks of) busbars of a second relay within the relay package enclosed by enclosure 914 and the second ends of wires 912a and 912b are respectively connected to (via a breaker) the load tray's busbar L2 and a terminal of a downstream load. As mentioned above, the heat that is generated by the contacts of the two relays of the relay package enclosed by enclosure 914 will be drawn away from those contacts by the relay's respective pair of busbars and then drawn out of enclosure 914 via wires 910a, 910b, 912a, and 912b.

Figure 10:
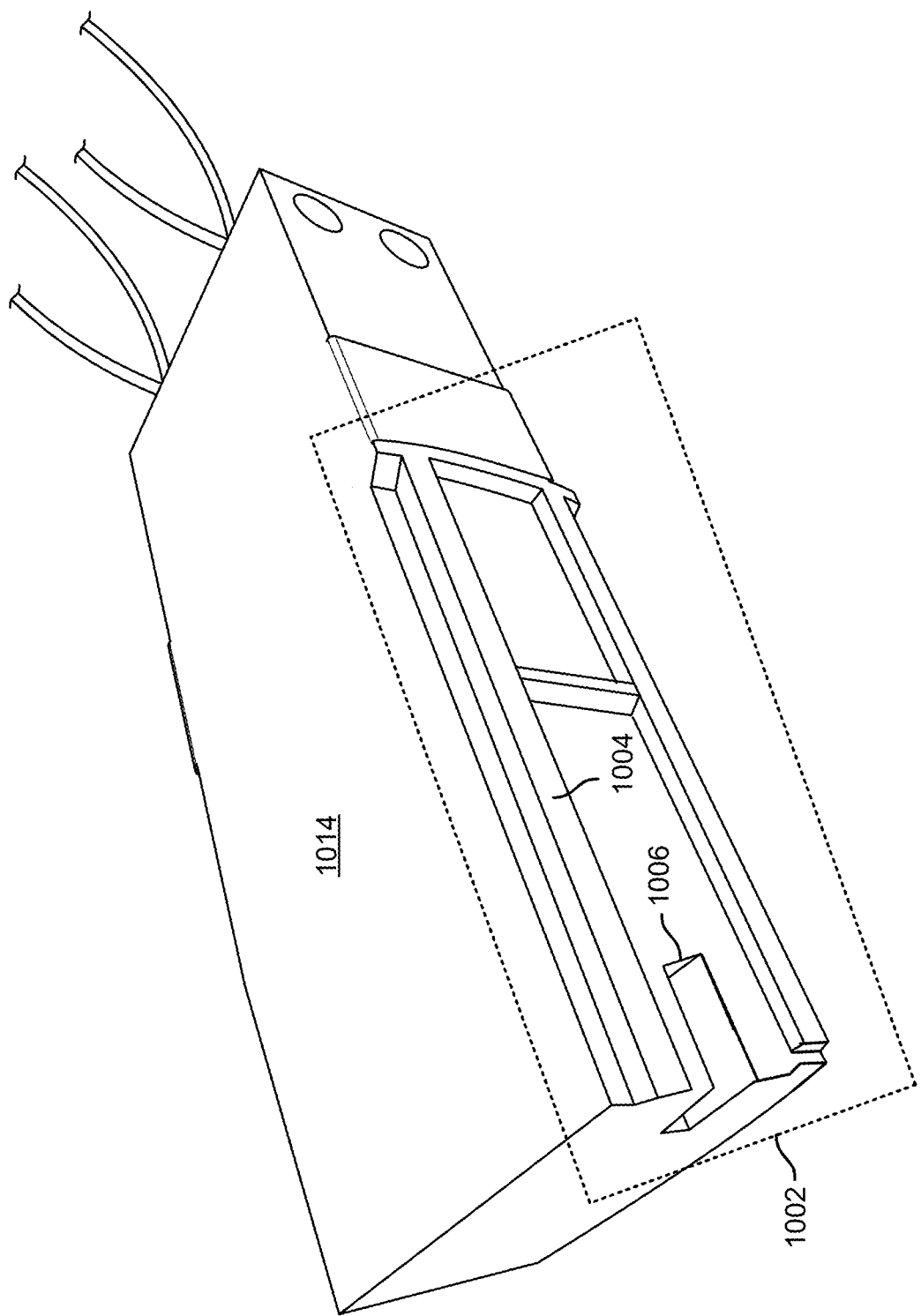
FIG. 10 is a diagram showing an engagement feature on an enclosure of a relay package in accordance with some embodiments.

FIG. 10 is a diagram showing an engagement feature on an enclosure of a relay package in accordance with some embodiments. In the example of FIG. 10, a relay package is shown with enclosure 1014 that is closed. Engagement feature 1002, located on the bottom surface of enclosure 1014 is highlighted in FIG. 10. As will be described in further detail below, enclosure 1014 of a relay package occupies the footprint (e.g., dimensions of the bottom surface) of a (e.g., single-pole) breaker by engaging into the load tray via a mounting mechanism (not shown in FIG. 10 that shares the similar footprint (e.g., dimensions of the bottom surface) of a (e.g., single-pole) breaker). Enclosure 1014 of a relay package engages with this mounting mechanism via its engagement feature 1002, which is located at a portion of its bottom surface. In the example shown in FIG. 10, engagement feature 1002 is shown to include side protrusions such as 1004 that will slide into corresponding grooves of a mounting mechanism. Furthermore, enclosure 1014 of a relay package is shown to include slot 1006 (a slot-shaped recess) that extends a similar slot on the mounting mechanism and where the combination of slot 1006 and the slot on the mounting mechanism will grab onto (in an electrically insulating manner given the electrically insulating nature of enclosure 1014 and the mounting mechanism) a stab in the middle of the load tray.

Figure 11:
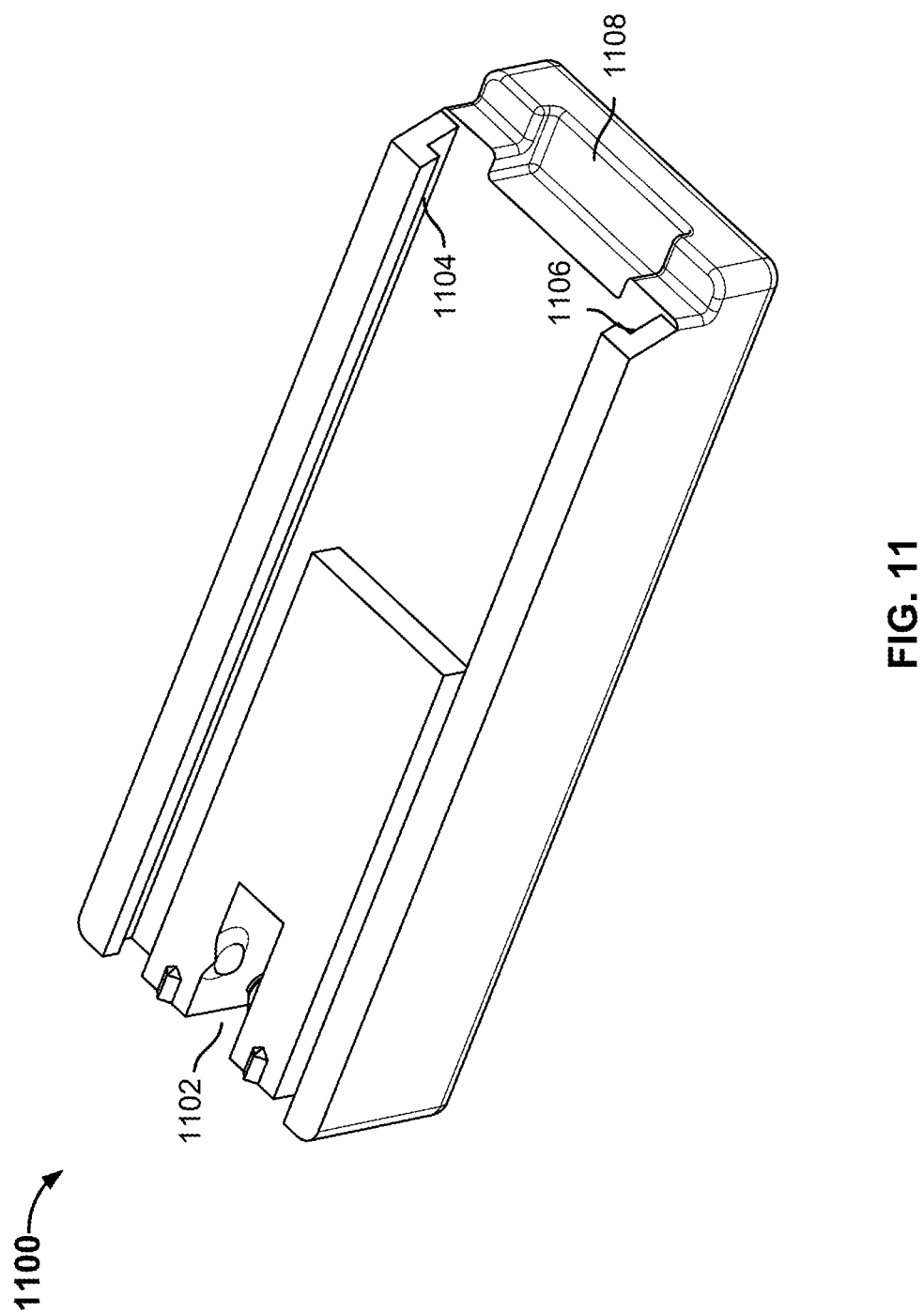
FIG. 11 is a diagram showing an example of a mounting mechanism in accordance with some embodiments.

FIG. 11 is a diagram showing an example of a mounting mechanism in accordance with some embodiments. Mounting mechanism 1100 is an example of a mounting mechanism that can engage with the engagement feature of the enclosure (e.g., enclosure 914 of FIG. 9) of a relay package and then be installed into the footprint/space of a (e.g., single-pole) breaker in a load tray. For example, to engage with engagement feature 1002 of enclosure 1014 of FIG. 10 of a relay package, a pair of protrusions (e.g., including protrusion 1004) of engagement feature 1002 will slide into grooves 1104 and 1106 of mounting mechanism 1100. Once the pair of protrusions of engagement feature 1002 of FIG. 10 are slid into grooves 1104 and 1106 of mounting mechanism 1100, slot 1102 of mounting mechanism 1100 will align with slot 1006 of engagement feature 1002. To install the combined enclosed relay package and mounting mechanism onto a load tray, indented feature 1108 of mounting mechanism 1100 will engage with (e.g., hook under) an engagement feature (e.g., a hook/tooth) on a side of the load tray and the combination of slot 1006 of engagement feature 1002 of FIG. 10 and slot 1102 of mounting mechanism 1100 will form a longer slot that will engage with/grab onto a stab of the load tray.

Figure 12A:
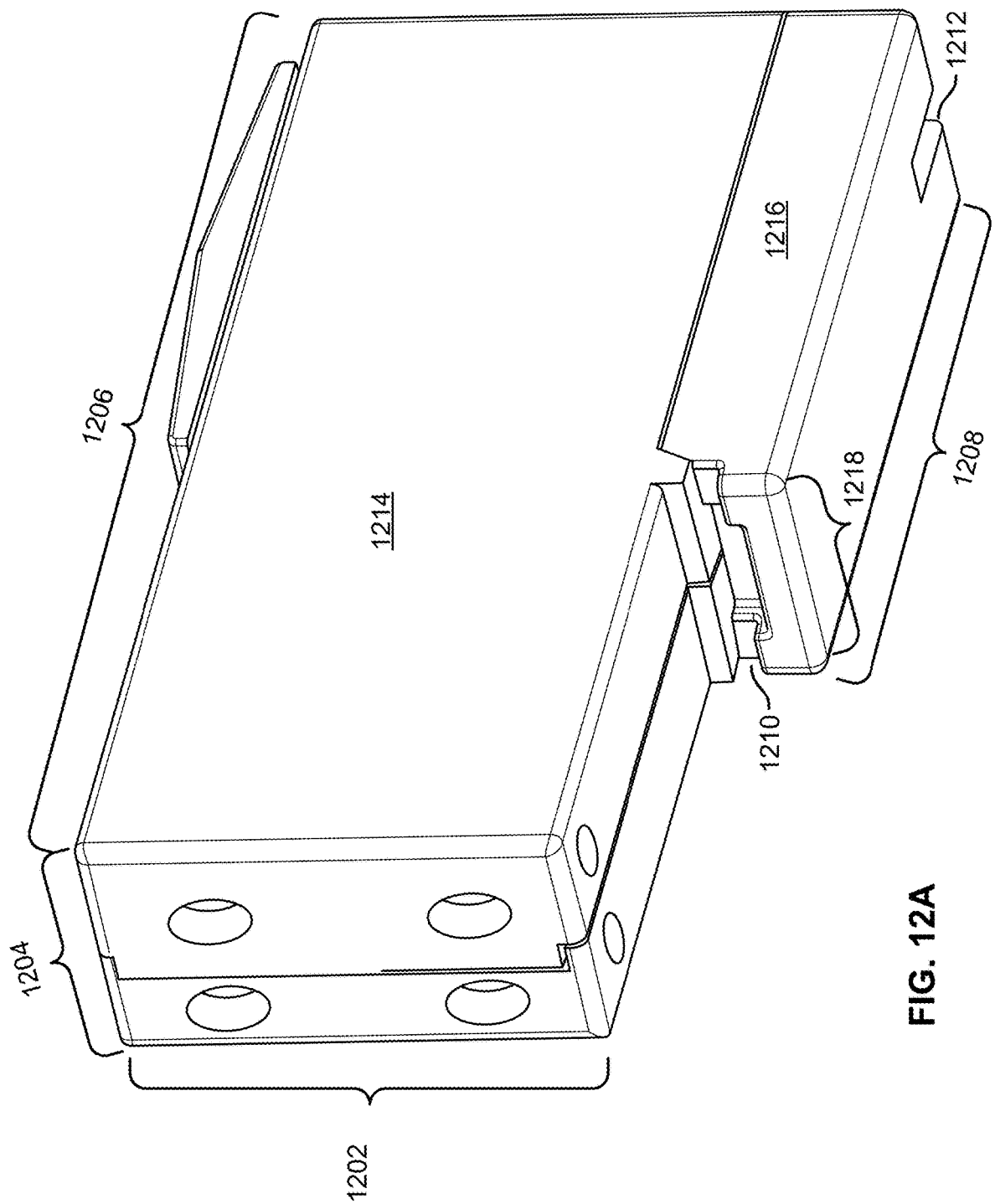
FIG. 12A is a diagram showing a first view of an enclosed relay package engaged with a mounting mechanism in accordance with some embodiments.

FIG. 12A is a diagram showing a first view of an enclosed relay package engaged with a mounting mechanism in accordance with some embodiments. In the example of FIG. 12A, an engagement feature of the enclosed relay package 1214 (e.g., the enclosure of which can be implemented using enclosure 1014 of FIG. 10) has been engaged with mounting mechanism 1216 (e.g., which can be implemented using mounting mechanism 1100 of FIG. 11). As shown in the example of FIG. 12A, only a portion of the bottom surface of enclosed relay package 1214 is engaged with mounting mechanism 1216. As will be described further below, mounting mechanism 1216 will engage with features of the load tray to secure enclosed relay package 1214 into the load tray. In particular, to engage with features of the load tray, indented feature 1210 is to be engaged with an engagement mechanism on the side of the load tray and slot 1212 is to be placed around a stab in the middle of the load tray.

In various embodiments, while enclosed relay package 1214 shares a comparable width as mounting mechanism 1216, enclosed relay package 1214 has a longer length than mounting mechanism 1216. For example, length 1206 of enclosed relay package 1214 is about 124 mm, width 1204 of enclosed relay package 1214 is about 25 mm, and height 1202 of enclosed relay package 1214 is about 49 mm. In one example, length 1208 of mounting mechanism 1216 is about 70 mm and width 1218 of mounting mechanism 1216 is about 25 mm. Width 1204 of enclosed relay package 1214 and width 1218 of mounting mechanism 1216 is each comparable to the one inch width of a standard-size (e.g., single-pole) breaker. Given that, in various embodiments, enclosed relay package 1214 is longer than mounting mechanism 1216 and length 1208 of mounting mechanism 1216 is comparable to the length of a standard-size (e.g., single-pole) breaker, the length of enclosed relay package 1214 extends beyond the side of the load tray. Despite potentially extending beyond the side of the load tray, enclosed relay package 1214 can still be placed securely within the load tray via its attachment to mounting mechanism 1216, which is directly installed to the load tray.

Figure 12B:
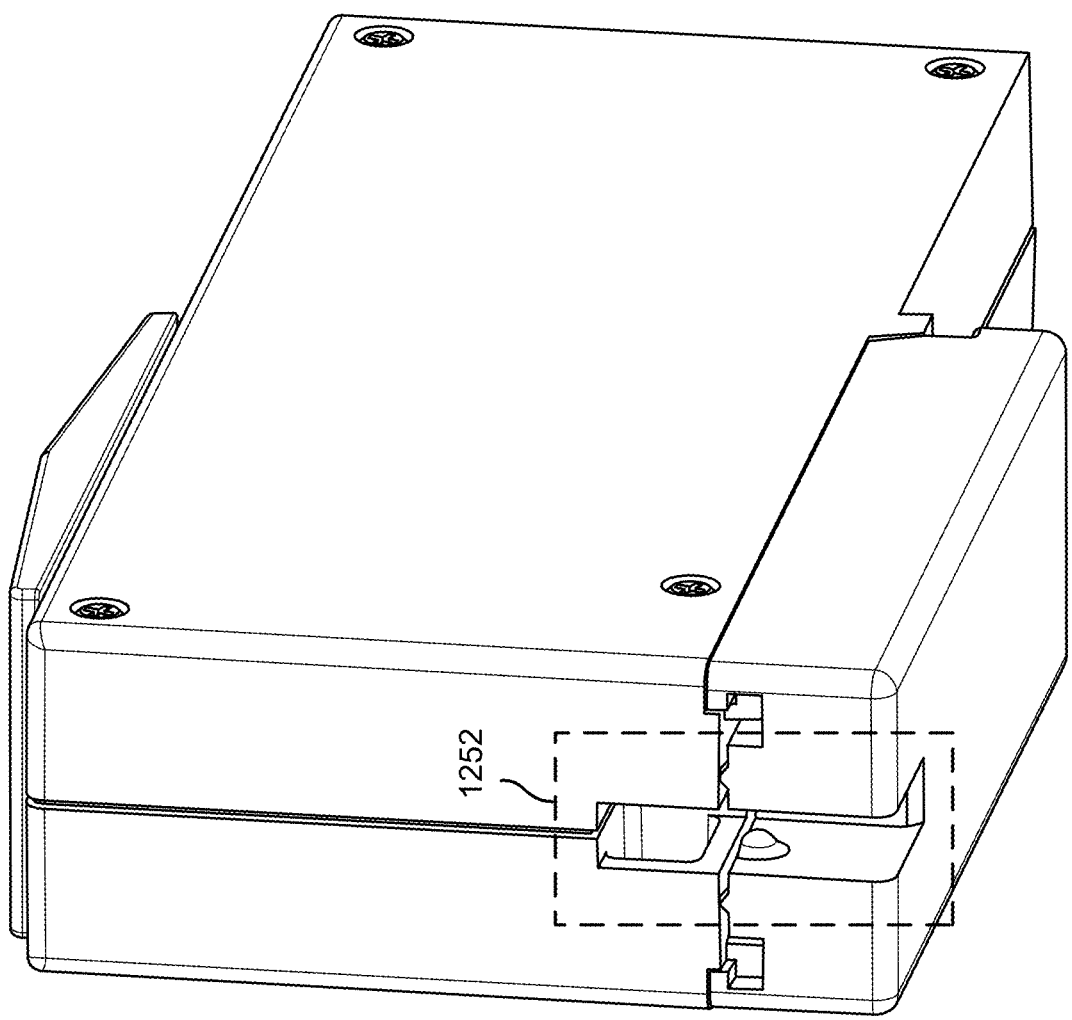
FIG. 12B is a diagram showing a second view of an enclosed relay package engaged with a mounting mechanism in accordance with some embodiments.

FIG. 12B is a diagram showing a second view of an enclosed relay package engaged with a mounting mechanism in accordance with some embodiments. In particular, FIG. 12B shows a different view of the combination of relay package 1214 and mounting mechanism 1216 that were shown in FIG. 12A. In the view that is shown in FIG. 12B, combined slot 1252, which is formed by the respective slots of the enclosed relay package and the mounting mechanism, is shown. For example, combined slot 1252 is the combination of slot 1102 of mounting mechanism 1100 from FIG. 11 and slot 1006 of engagement feature 1002 from FIG. 10. As mentioned above, combined slot 1252 can be engaged with a stab on the load tray. Combined slot 1252 would engage with the stab in an electrically insulated manner given that both the enclosure of the relay package and the mounting mechanism are manufactured out of non-electrically conductive materials (e.g., plastic). As such, combined slot 1252 can engage with a stab on the load tray in a manner that physically secures the enclosed relay package to the load tray without drawing current from the stab.

Figure 13:
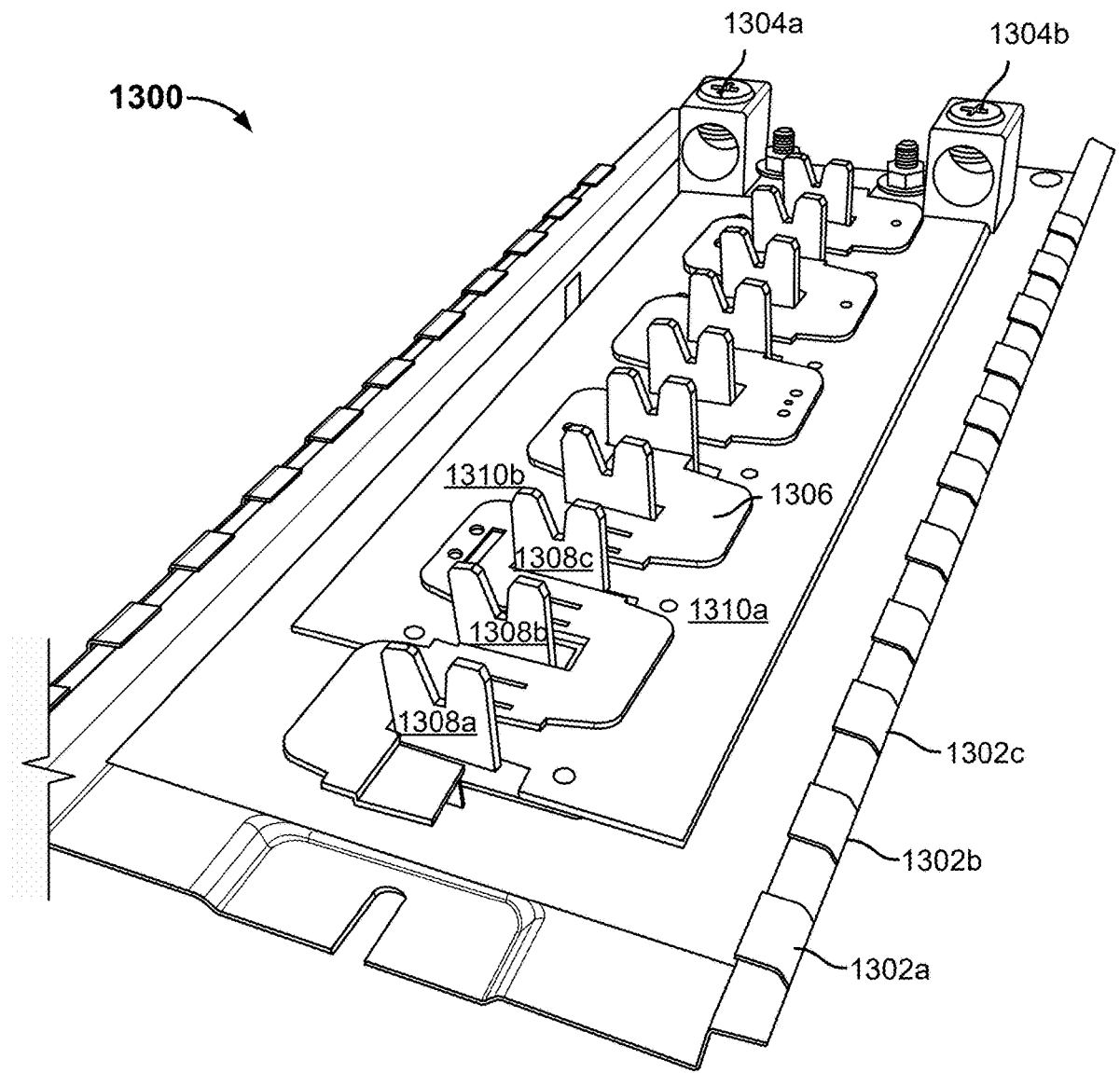
FIG. 13 is a diagram showing an example of an empty load tray in accordance with some embodiments.

FIG. 13 is a diagram showing an example of an empty load tray in accordance with some embodiments. In FIG. 13, load tray 1300 includes busbars 1310a and 1310b that are held in place by busbar cover 1306 (which ensures electrical isolation between busbars 1310a and 1310b to prevent electrical arcing between the two conductors), which snakes around 10 stabs, including stabs 1308a, 1308b, and 1308c, that are connected by busbars 1310a and 1310b. In some embodiments, busbar L1 and busbar L2 of FIG. 2 can be implemented using busbars 1310a and 1310b, respectively. Busbars 1310a and 1310b carry current from terminal lugs 1304a and 1304b to each breaker (not shown) that is to be plugged into one of the stabs. Load tray 1300 further includes engagement mechanisms, such as hooks 1302a, 1302b, and 1302c, that point towards the center of load tray 1300 along each of its length-wise sides. In FIG. 13, power is to enter load tray 1300 at terminal lugs 1304a and 1304b (for L1 and L2 power input). As will also be described in further detail below, to install an enclosed relay package connected to a mounting mechanism into load tray 1300, an indented feature (e.g., indented feature 1210 as shown in FIG. 12A) of the mounting mechanism is engaged with (e.g., secured under) one or more hooks of load tray 1300 and the combined slot (e.g., combined slot 1252 as shown in FIG. 12B) across the enclosed relay package and the mounting mechanism is secured over a stab (e.g., one of stabs 1308a, 1308b, and 1308c).

Figure 14:
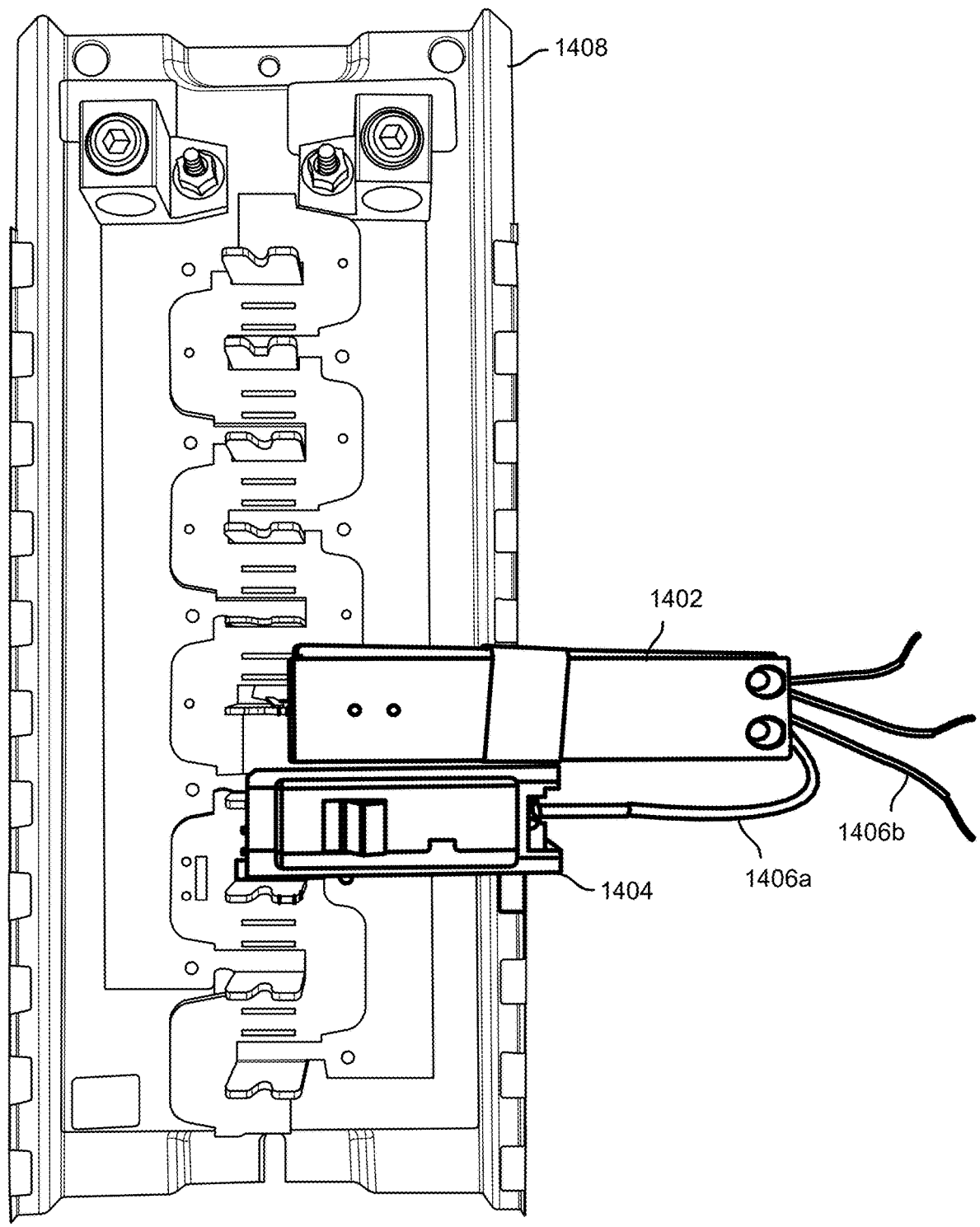
FIG. 14 is a diagram showing an example of an enclosed relay package that has been installed into a load tray.

FIG. 14 is a diagram showing an example of an enclosed relay package that has been installed into a load tray. In some embodiments, enclosed relay package 1402 of FIG. 14 can be implemented using the enclosed relay package that is shown in either of FIG. 9 or 10. In some embodiments, relay package 112 of FIG. 1 can be implemented using enclosed relay package 1402 of FIG. 14. As described above, a portion of the bottom surface of enclosed relay package 1402 is engaged to a mounting mechanism, which is occluded in FIG. 14. The combination of enclosed relay package 1402 and a (occluded) mounting mechanism is installed into load tray 1408 by virtue of first engaging the indented feature (e.g., indented feature 1210 as shown in FIG. 12A) of the mounting mechanism with one or more hooks of load tray 1408 and then pivoting the combined slot (e.g., combined slot 1252 as shown in FIG. 12B) across enclosed relay package 1402 and the mounting mechanism to plug onto a stab. As mentioned above, while the (occluded) mounting mechanism is fitted between a stab in the middle and one or more hooks on a side of load tray 1408, enclosed relay package 1402 extends beyond the engaged side of load tray 1408 but still fits within the enclosure of load tray 1408, which is not shown in FIG. 14. FIG. 14 also shows single-pole breaker 1404, which has also been installed into load tray 1408. For example, to install single-pole breaker 1404 into load tray 1408, a portion of single-pole breaker 1404 can be first secured under one or more hooks of load tray 1408 before single-pole breaker 1404 is pivoted to plug onto a corresponding stab. Unlike enclosed relay package 1402 and the attached mounting mechanism, single-pole breaker 1404 is electrically connected to the stab.

As shown in FIG. 14, even though enclosed relay package 1402 extends beyond the engaged side of load tray 1408, its footprint (comprising the dimension of the engaged mounting mechanism) within load tray 1408 is comparable to that of single-pole breaker 1404. Also as shown in FIG. 14, enclosed relay package 1402 is connected to single-pole breaker 1404 via wire 1406a. Wire 1406a is connected to a busbar of one relay within enclosed relay package 1402. The other busbar of the same relay within enclosed relay package 1402 is connected to wire 1406b, which will in turn be connected to a load (not shown in FIG. 14).

Various embodiments of an intelligent relay package that is compact enough to sit in a load tray are described herein. Moreover, by virtue of being compatible to be installed in a load tray, the relay package can be co-located with circuit breakers to which the relay(s) of the relay package are connected via wiring. By designing the relay package to fit into the load tray to which the breakers are typically placed, an installer will be familiar with the installation of the relay package and will not need to make custom modifications to the load tray to accommodate the relay package. The wiring between breaker(s)/load(s) and the relay package provides the additional benefit of acting as a heat sink for the heat that is generated by the relays within the relay package so that the internal temperature within the relay package does not undesirably rise given the package's compact form factor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An intelligent relay package, comprising:
    a relay configured to control delivery of current to a load, wherein the relay comprises a set of contacts, wherein the relay is coupled to a carrier board;
    a set of rigid busbars coupled to the set of contacts of the relay, wherein the set of rigid busbars is configured to transfer heat generated due to contact resistance away from the set of contacts and to a set of wires coupled to the set of rigid busbars, wherein the carrier board comprises a current sensor located below a first busbar of the set of rigid busbars, wherein the current sensor is configured to measure a strength of a magnetic field associated with the first busbar, wherein the strength of the magnetic field is determined as a proxy measurement of the current across the set of contacts of the relay; and an enclosure that houses the relay and the set of rigid busbars, wherein the enclosure includes apertures through which the set of wires passes to draw heat out of the enclosure, wherein the enclosure comprises a recess that is configured to mechanically engage with a stab of a load tray to physically secure the enclosure into the load tray, wherein the enclosure comprises an electrically insulating material, wherein the enclosure comprises an indented feature to engage with an engagement mechanism on a side of the load tray to further physically secure the enclosure into the load tray, wherein a length of the enclosure that is physically secured into the load tray extends beyond the side of the load tray;

wherein the intelligent relay package is sized to fit into a single slot of the load tray.

2. The intelligent relay package of claim 1, wherein the relay comprises a first relay, wherein the intelligent relay package further comprises a second relay, wherein the first relay and the second relay are stacked together in the intelligent relay package.

3. The intelligent relay package of claim 1, wherein the relay comprises a single pole single throw relay.

4. The intelligent relay package of claim 1, further comprising a relay driver that receives an instruction to open or close the relay.

5. The intelligent relay package of claim 1, further comprising an integrated metering chip that collects current telemetry associated with the relay and sends the current telemetry to a hub device, wherein the current telemetry is determined based at least in part on the strength of the magnetic field as measured by the current sensor.

6. The intelligent relay package of claim 1, wherein the current sensor comprises a Hall effect sensor.

7. The intelligent relay package of claim 1, further comprising a solid capacitor.

8. The intelligent relay package of claim 1, wherein the set of wires is configured to connect to a circuit breaker.

9. The intelligent relay package of claim 1, wherein the set of wires is configured to connect to the load.

10. The intelligent relay package of claim 1, wherein the set of rigid busbars are rigid throughout.

11. The intelligent relay package of claim 1, wherein the set of rigid busbars comprises copper.

12. The intelligent relay package of claim 1, wherein the relay is configured to connect in series to a circuit breaker.

13. The intelligent relay package of claim 1, wherein a width of the enclosure is similar to a width of a standard-size single-pole circuit breaker.

14. The intelligent relay package of claim 1, wherein the enclosure further comprises an engagement feature, wherein the engagement feature is configured to engage to a mounting mechanism.

15. The intelligent relay package of claim 14, wherein the mounting mechanism comprises the indented feature and a slot-shaped recess, and wherein a combination of the slot-shaped recess of the mounting mechanism and the recess of the enclosure is configured to mechanically engage with the stab of the load tray to physically secure the intelligent relay package into the load tray.

16. The intelligent relay package of claim 14, wherein the mounting mechanism and the enclosure comprise the electrically insulating material.

17. The intelligent relay package of claim 1, wherein the current sensor is oriented parallel to a travel of current through the first busbar.

* * * * *